Sept. 4, 1923. 1,467,058
C. H. MORSE
LIQUID MEASURING APPARATUS
Filed April 28, 1921  3 Sheets-Sheet 1
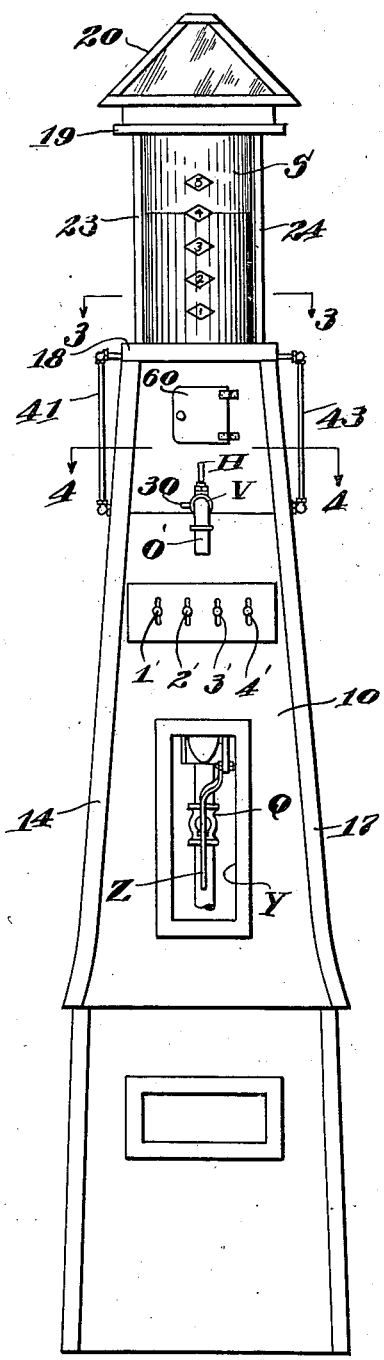
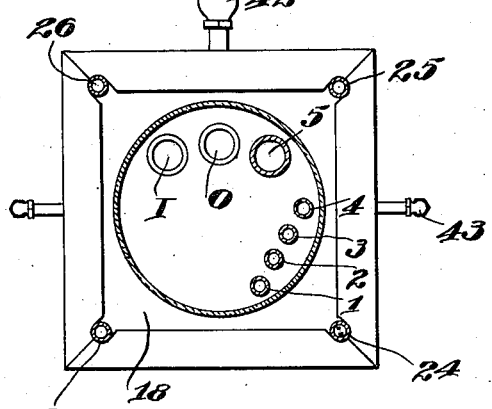
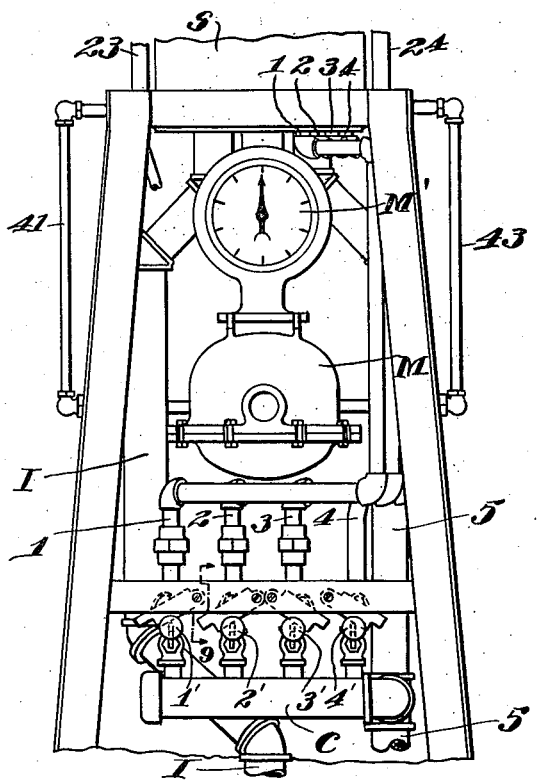
Inventor
Chester H. Morse
by Roberts Roberts & Cushman
his Attorneys Sept. 4, 1923.

C. H. MORSE

LIQUID MEASURING APPARATUS

Filed April 28, 1921

Inventor
Chester H. Morse
By Roberts, Roberts & Cushman
his Attorneys

Sept. 4, 1923.
C. H. MORSE
1,467,058
LIQUID MEASURING APPARATUS
Filed April 28, 1921 3 Sheets-Sheet 3
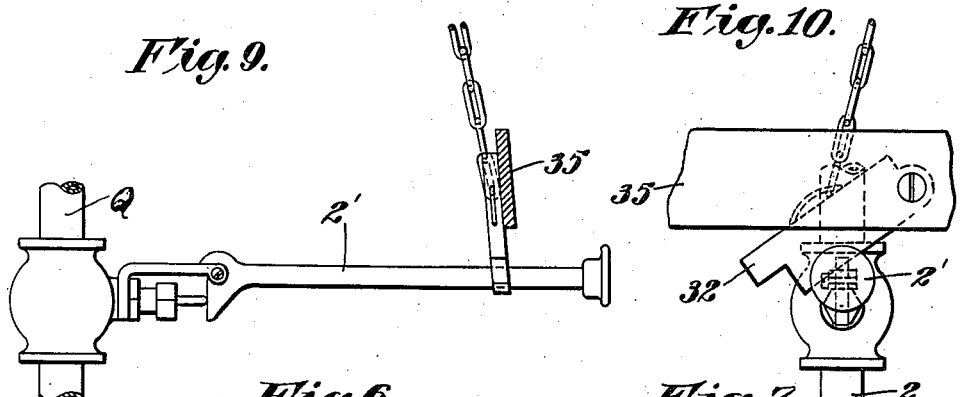
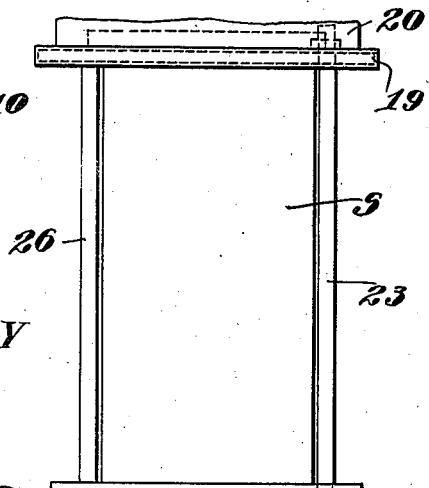
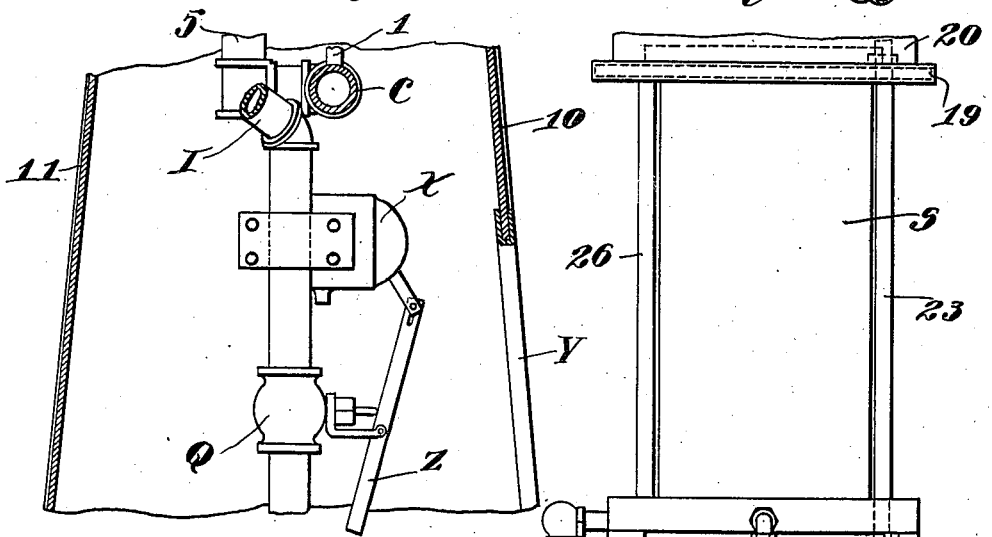
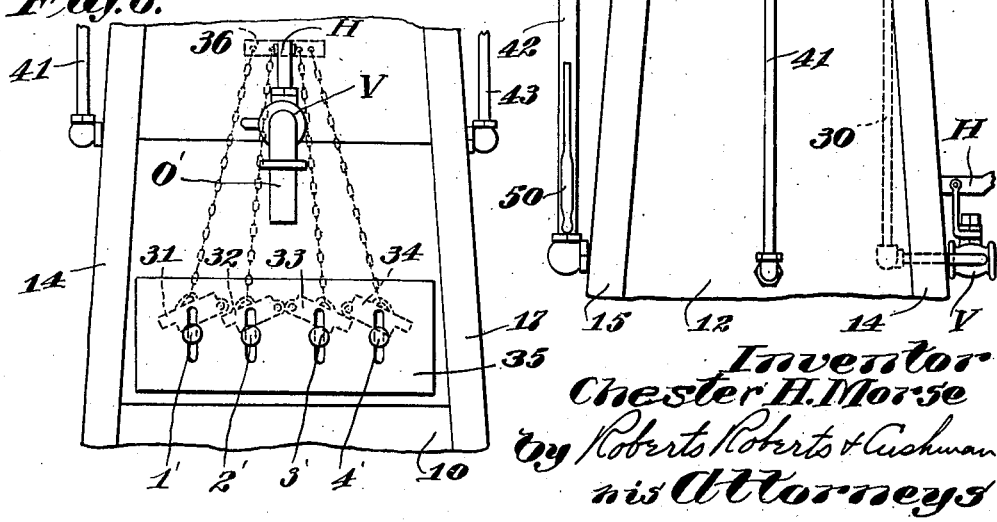
Inventor
Chester H. Morse
by Roberts Roberts & Cushman
his Attorneys Patented Sept. 4, 1923.

1,467,058

UNITED STATES PATENT OFFICE.

CHESTER H. MORSE, OF TAUNTON, MASSACHUSETTS.

LIQUID-MEASURING APPARATUS.

Application filed April 28, 1921. Serial No. 465,151.

*To all whom it may concern:*

Be it known that I, CHESTER H. MORSE, citizen of the United States of America, and resident of Taunton, in the county of Bristol and State of Massachusetts, have invented new and useful Improvements in Liquid-Measuring Apparatus, of which the following is a specification.

This invention relates to liquid dispensing apparatus of the type adapted to dispense liquid in measured quantities and more particluarly to gasoline dispensing apparatus of the type in which the gasoline is measured in a sight chamber before being fed to the gasoline tank in the automobile, this invention being in the nature of an improvement on that disclosed in my prior application Sr. No. 431,685, filed December 17, 1920.

The objects of the invention are to provide dispensing apparatus of the type referred to in which the liquid is accurately measured, in which the amount of liquid dispensed cannot be less than that indicated in the sight chamber, in which the measuring devices for controlling the level in the sight chamber are automatically closed when the sight chamber is emptied, in which the quality of the liquid is automatically indicated in which gauges are arranged to indicate when the apparatus is fully drained, in which the outlet is conveniently and effectively vented, and which is generally superior in accuracy, convenience and appearance.

In order more clearly to disclose the nature of the invention I have illustrated a concrete embodiment in the accompanying drawings, in which, Fig. 1 is a front elevation of the apparatus;

Fig. 2 is a front elevation, on an enlarged scale, of the central portion of the apparatus, with the front cover plates removed;

Fig. 3 is a horizontal section on line 3—3 of Fig. 1;

Fig. 6 is a downward continuation of the section shown in Fig. 5;

Fig. 7 is a left-hand elevation of the upper central portion;

Fig. 8 is a front elevation of the central portion of the apparatus;

Fig. 9 is a detail viewed from line 9—9 of Fig. 2; and

Fig. 10 is a front elevation of the detail shown in Fig. 9.

Figure 5:
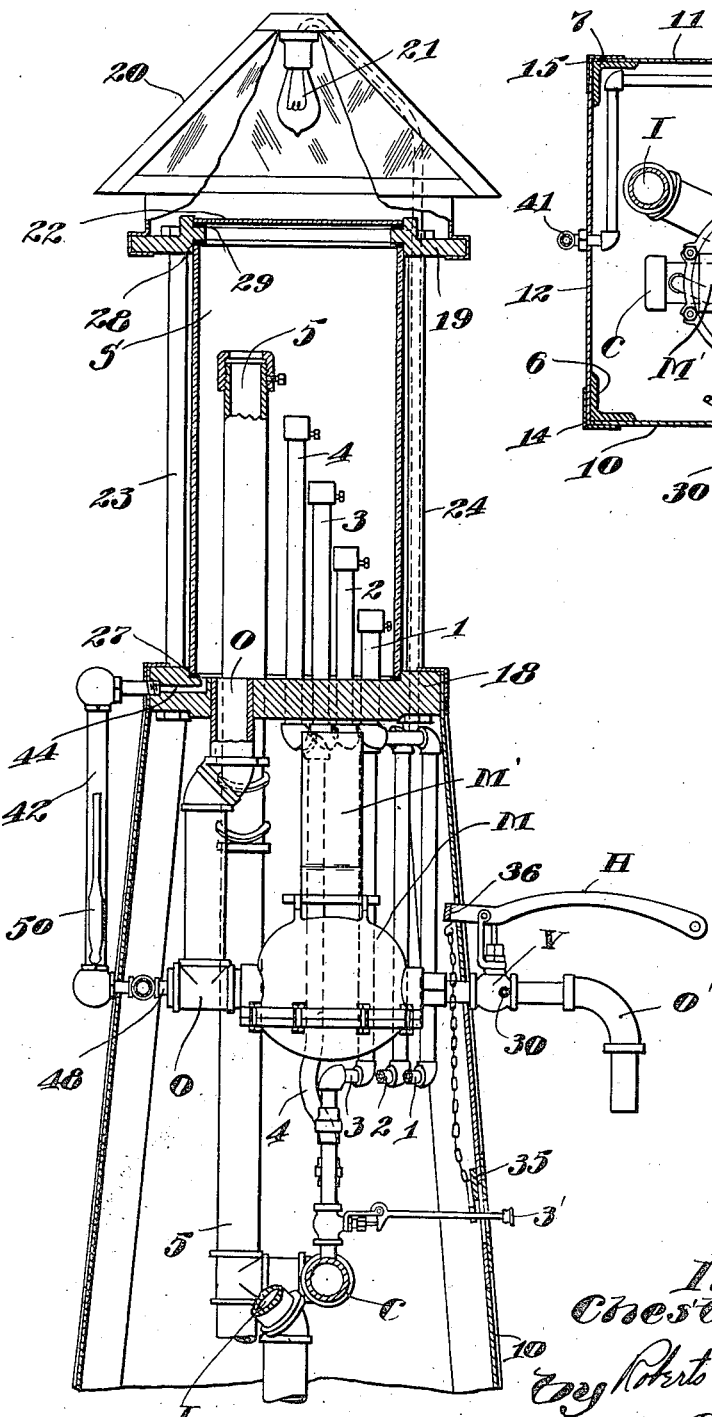
Fig. 5 is a vertical longitudinal section of the upper portion of the apparatus.

The illustrated embodiment of the invention comprises in general a rectangular frame formed of four angles irons 6, 7, 8 and 9 covered over with sheet metal walls, 10 indicating the front wall, 11 the rear wall, 12 the left end wall, and 13 the right end wall, the abutting corners of the sheet metal walls being covered with angular brass moldings 14, 15, 16 and 17. As indicated in Fig. 1, the central portion of the frame is tapered toward the top and in the upper end of this tapered portion is mounted a horizontal block 18. Mounted on this block is the sight chamber S which comprises a glass cylinder. Fitting over the top of the glass cylinder is a ring 19 carrying a canopy 20 in which is mounted an electric lamp 21, the sides of the canopy being formed of glass so that the light is visible through the canopy, and the disk 22 closing the upper end of the sight chamber S also being formed of glass so that light may shine therethrough into the sight chamber. The block 18 and ring 19 are connected together by four tubes 23, 24, 25 and 26 at the four corners of the apparatus, the ends of these tubes being threaded to receive nuts below the block 18 and above the ring 19, thereby to secure the parts together. Cork gaskets are preferably provided at 27, 28 and 29 (Fig. 5). The conductors for the lamp 21 extend through the tube 24; and a vent pipe 30, hereinafter to be described, connects the lower end of the tube 23 so that this tube also serves as a part of the vent passage.

Gasoline is supplied to the sight chamber S through the inlet pipe I and is drawn from the chamber through the outlet pipe O and thence through the nozzle O', it being understood that a hose would ordinarily be fitted over the end of the nozzle O'. A valve Q is provided in the inlet pipe I to control the flow of liquid to the sight chamber, this valve having an actuating handle Z which is accessible through an opening Y in the front wall 10 of the housing (Figs. 1 and 6). Inserted in the outlet O is a liquid flow meter M which controls an indicator M', visible through door 60 (Fig. 1) to indicate the amount of liquid, preferably in terms of gallons, which passes through the outlet O. A valve V, having an actuating handle H, is provided in the outlet O, this valve being of the type which is opened by depressing the handle and which closes automatically by means of an interior spring. The vent pipe 30, which communicates with the tube 23 as above described, connects at its lower end with a valve V (Figs. 5 and 7).

The measuring devices comprise pipes 1, 2, 3, 4 and 5 extending upwardly through the base block 18, into the sight chamber S, the upper ends of these pipes being adjusted to such levels that liquid will overflow through the respective pipes when the sight chamber is supplied with 1, 2, 3, 4 or 5 gallons of liquid respectively. The pipe 5 is somewhat larger than the other pipes and communicates directly with the reservoir from which gasoline is drawn into the sight chamber. These pipes are preferably provided with adjustable caps as illustrated in Fig. 5 by which the levels of their upper ends may be accurately adjusted. Below the block 18 and within the rectangular housing the pipes 1, 2, 3, and 4 connect with a common manifold C, joining the pipe 5, through valves having actuating handles 1', 2', 3' and 4' extending outwardly through slots in the forward wall of the housing. These valves are also of the type adapted to be opened by depressing the handles and to be closed automatically by interior springs when the handles are released. Detents 31, 32, 33 and 34 are pivotally mounted on a bar 35 fast to the inner side of the front wall 10 in such position that they automatically drop into position to hold the handles down when the handles are moved into position to open the valves, the notches in the lower corners of the latches fitting over the handles 1', 2', 3' and 4' (Figs. 8 and 10). Each of these latches is connected by means of a chain to a transverse bar 36 fast on the inner end of the outlet handle H, so that all of the latches are lifted into position to release the handle 1', 2', 3' and 4', each time the outlet handle H is depressed.

Figure 4:
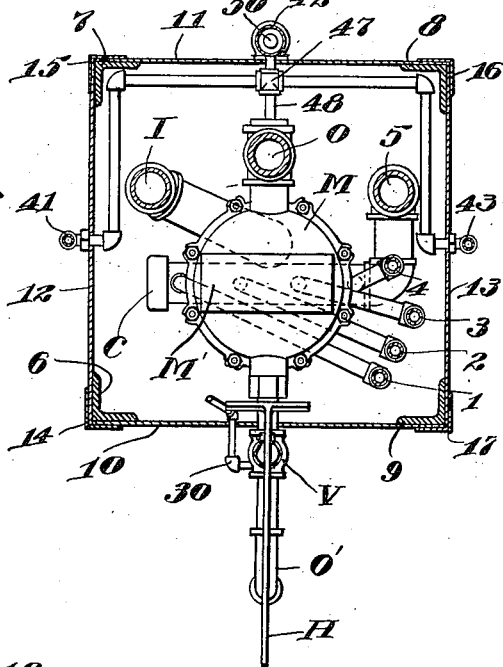
Fig. 4 is a horizontal section on line 4—4 of Fig. 1.

In addition to the main outlet pipe O three branch pipes are provided in the illustrated embodiment, namely, the pipe 41, at the left-hand side of the apparatus, the pipe 42 at the rear, and the pipe 43 at the right-hand side. Each of these pipes communicates with the bottom of the sight chamber through a duct in the block 18, as illustrated in Fig. 5. The lower ends of these three pipes are joined together by a coupling 47 (Fig. 4) and thence connect through pipe 48 with the main outlet O (Fig. 5). Each of the pipes 41 and 42 and 43 is formed of glass so that the gasoline or other liquid flowing therethrough may be observed. The rear pipe 42 is somewhat larger than the side pipes 41 and 43 and contains a hydrometer 50 which is adapted to indicate the quality of the gasoline being dispensed.

The operation of the apparatus is as follows: Assuming that five gallons of gasoline is to be dispensed the valve Q is opened by means of handle Z permitting gasoline to flow into the sight chamber through pipe I until the sight chamber is filled to such extent that gasoline overflows through pipe 5. The valve Q is then closed and due to the overflow through pipe 5 the liquid in the sight chamber subsides to the level of the upper end of pipe 5. The outlet valve V is then actuated by handle H permitting the measured five gallons to flow through the main outlet pipe O and through the branch outlets 41 and 42 and 43, thence through the flow meter M and thence through the nozzle O'. After the liquid has settled to a level intermediate the upper and lower ends of pipe 42 the hydrometer may be observed to ascertain the quality of the gasoline, the valve V being closed temporarily if desired while the reading is being taken. The pipes 41 and 43, which are formed of glass as well as pipe 42, serve to indicate when the sight chamber and the outlet pipes have been completely drained, so that a customer may be assured that he has received all of the gasoline measured out in the sight chamber. The vent pipe 30 serves to permit more rapid flow of the liquid through the outlet pipe.

If less than five gallons of gasoline is desired, say three gallons, the valve 3' is first opened by moving it downwardly, whereupon the latch 33 swings downwardly (Figs. 8 and 10) until the V-shaped recess in the free end thereof is in the path of the valve and thereby holds the valve open. The inlet valve Q is then opened as before until the liquid rises in the sight chamber to or above the level of the upper end of pipe 3. After the liquid has overflowed through the pipe 3 until it stands at the level of the upper end of this pipe the outlet valve V is opened as before, permitting the liquid to be delivered through the nozzle O'. When the valve V is opened the latch 33 is lifted and the valve 3' is closed. In this way it is impossible to leave any one of the overflow valves (1', 2', 3', 4') open after the sight chamber has been emptied.

From the foregoing it will be evident that the amount of liquid dispensed cannot be less than that indicated in the sight chamber by virtue of the interconnection between the overflow valves and the outlet valve. If it were not for this interconnection one of the overflow valves might be inadvertently left open; if then, a larger quantity of gasoline were attempted to be dispensed part of the larger quantity would escape through the overflow pipe inadvertently left open so that the customer would not receive the entire quantity. For example, if valve 3' were inadvertently left open and the operator then attempted to deliver five gallons, the gasoline would not only overflow through pipe 5 but also through pipe 3, and unless this condition were noticed a part of the measured five gallons would escape through the overflow 3.

Another important feature, from a practical standpoint, is the sight drain (41, 42 and 43) by which the customer may be assured that he has received the entire amount measured in the sight chamber. The unique means for automatically indicating the quality, as well as the quantity of the gasolene, is also an advantageous improvement.

As illustrated in Fig. 6 the inlet valve handle Z may be connected to an electric switch X controlling the pump motor so that the pump motor is automatically started and stopped when the valve is opened and closed. This is particularly advantageous when a plurality of my improved dispensing apparatuses draw from a common reservoir inasmuch as a common pump motor may be controlled by a starter X associated with each dispensing apparatus.

I claim:

1. Liquid dispensing apparatus comprising a measuring chamber, means for filling said chamber to various levels corresponding to predetermined quantities of liquid, said means including a valve for each quantity, an outlet for conducting the liquid from said chamber, a valve in said outlet, and means interconnecting said last valve with said first valves so that any of the first valves which is open is closed when said last valve is open.

2. Liquid dispensing apparatus comprising a measuring chamber, means for filling said chamber to various levels corresponding to predetermined quantities of liquid, said means including a self-closing valve for each quantity, detent means for holding said valves open, an outlet for conducting the liquid from said chamber, an outlet valve in said outlet, and means interconnecting said outlet valve with said detent means so as to move the detent means out of holding position when the outlet valve is opened.

3. Liquid dispensing apparatus comprising a measuring chamber, overflows opening into said chamber at various levels, an overflow valve in each of said overflows, an outlet leading from said chamber, an outlet valve in said outlet, and means interconnecting said valves so that any open overflow valve is closed when the outlet valve is open.

4. Liquid dispensing apparatus comprising a measuring chamber, overflows opening into said chamber at various levels, a self-closing overflow valve in each of said overflows, detent means for holding said valves open, an outlet for conducting the liquid from said chamber, an outlet valve in said outlet, and means interconnecting said outlet valve with said detent means so as to move the detent means out of holding position when the outlet valve is opened.

Signed by me at Boston, Massachusetts, this 22nd day of April, 1921.

CHESTER H. MORSE.